United States Patent
Vigneaux et al.

(10) Patent No.: US 9,798,023 B2
(45) Date of Patent: Oct. 24, 2017

(54) OPTICAL FIBER WELL DEPLOYMENT FOR SEISMIC SURVEYING

(71) Applicant: Schlumberger Technology Corporation, Sugar land, TX (US)

(72) Inventors: Pierre Vigneaux, Moisenay (FR); Arthur H. Hartog, Winchester (GB); Bernard Frignet, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 313 days.

(21) Appl. No.: 14/370,487

(22) PCT Filed: Jan. 4, 2013

(86) PCT No.: PCT/US2013/020406
§ 371 (c)(1),
(2) Date: Jul. 3, 2014

(87) PCT Pub. No.: WO2013/103908
PCT Pub. Date: Jul. 11, 2013

(65) Prior Publication Data
US 2014/0376332 A1    Dec. 25, 2014

(30) Foreign Application Priority Data
Jan. 6, 2012 (EP) ..................... 12250004

(51) Int. Cl.
*G01V 1/40* (2006.01)
*G01V 1/18* (2006.01)
(Continued)

(52) U.S. Cl.
CPC ........... *G01V 1/18* (2013.01); *G01V 1/226* (2013.01); *G01V 1/42* (2013.01); *G01H 9/004* (2013.01); *G01V 1/16* (2013.01); *G01V 1/40* (2013.01)

(58) Field of Classification Search
CPC ... G01V 1/18; G01V 1/40; G01V 1/42; G01V 1/52
(Continued)

(56) References Cited

U.S. PATENT DOCUMENTS 4,722,603 A * 2/1988 Graebner ............... E21B 47/04
356/477
4,923,011 A * 5/1990 Skipper .................. E21B 21/10
166/170

(Continued)

FOREIGN PATENT DOCUMENTS

CN    1979221 A    6/2007
CN    101680295    3/2010
(Continued)

OTHER PUBLICATIONS

European search report for the equivalent European patent application No. 13733734.1 issued on Dec. 7, 2015.
(Continued)

*Primary Examiner* — Ian J Lobo
(74) *Attorney, Agent, or Firm* — Trevor G. Grove

(57) ABSTRACT

Disclosed are a system, apparatus, and method for optical fiber well deployment in seismic optical surveying. Embodiments of this disclosure may include methods of deploying a spooled optical fiber distributed sensor into the wellbore integrated in a ballast or weight for a seismic optic tool, to achieve deployment of a lightweight disposable fiber optic cable against the wellbore walls via gravity. The method may further include unspooling the spooled optical fiber
(Continued)

distributed sensor and using the optical fiber as a distributed seismic receiver. Once the fiber optic distributed sensor is deployed according to methods of the present disclosure, surveys may be obtained and processed by various methods.

17 Claims, 4 Drawing Sheets

(51) Int. Cl.
*G01V 1/42* (2006.01)
*G01V 1/22* (2006.01)
*G01H 9/00* (2006.01)
*G01V 1/16* (2006.01)

(58) Field of Classification Search
USPC .................. 367/25; 181/102; 166/65.1, 385
See application file for complete search history.

(56) References Cited

U.S. PATENT DOCUMENTS

| | | | |
|---|---|---|---|
| 5,194,847 | A | 3/1993 | Taylor et al. |
| 5,285,204 | A * | 2/1994 | Sas-Jaworsky ....... E21B 17/203 175/40 |
| 5,435,395 | A * | 7/1995 | Connell ................ E21B 17/025 166/384 |
| 6,041,872 | A | 3/2000 | Holcomb |
| 6,561,488 | B1 | 5/2003 | Walker |
| 7,567,485 | B2 | 7/2009 | Nutt et al. |
| 2004/0117119 | A1 | 6/2004 | West et al. |
| 2005/0236161 | A1 * | 10/2005 | Gay ..................... E21B 47/123 166/380 |
| 2005/0279532 | A1 | 12/2005 | Ballantyne et al. |
| 2007/0165487 | A1 | 7/2007 | Nutt et al. |
| 2008/0066960 | A1 | 3/2008 | Mathiszik et al. |
| 2008/0144016 | A1 | 6/2008 | Lewis et al. |
| 2009/0219171 | A1 | 9/2009 | Vigneaux |
| 2009/0326826 | A1 | 12/2009 | Hull et al. |
| 2010/0200743 | A1 | 8/2010 | Forster et al. |
| 2011/0188346 | A1 | 8/2011 | Hull |
| 2011/0292763 | A1 | 12/2011 | Coates et al. |
| 2012/0067118 | A1 | 3/2012 | Hartog et al. |

FOREIGN PATENT DOCUMENTS

| | | |
|---|---|---|
| GB | 2126820 | 3/1984 |
| GB | 2222247 | 2/1990 |
| GB | 2401738 | 11/2004 |
| SU | 1007056 A | 3/1983 |
| WO | 2006/048647 | 5/2006 |
| WO | 2008/098380 | 8/2008 |
| WO | 2010/045286 | 4/2010 |
| WO | 2010/136810 | 12/2010 |
| WO | 2011/058314 | 5/2011 |

OTHER PUBLICATIONS

Office action for the equivalent Chinese patent application No. 201380007432.9 issued on Mar. 18, 2016.
Christie, P. et al., "Borehole Seismic Data Sharpen the Reservoir Image," Schlumberger Oilfield Review, Winter 1995, vol. 7, Issue 4, pp. 18-31.
Mestayer, J. et al., "Field Trials of Distributed Acoustic Sensing for Geophysical Monitoring," SEG San Antonio 2011 Annual Meeting Expanded Abstracts, pp. 4253-4257.
Barberan, C. et al., "Multi-Offset Acquisition Using Fiber Optic Behind Tubing," EAGE Copenhaguen 2012 Annual Meeting.
Decision of Grant issued in the corresponding RU application 2014132395, mailed Jan. 17, 2017 (18 pages).
European Communication issued in the related EP Application No. 13733734, dated Jan. 4, 2016 (7 pages).
International Search report and Written Opinion issued in the related PCT application PCT/US2013/020406, dated Apr. 29, 2013 (9 pages).
International Preliminary report on patentability issued in the related PCT application PCT/US2013/020406, dated Jul. 8, 2014 (5 pages).

* cited by examiner

OPTICAL FIBER WELL DEPLOYMENT FOR SEISMIC SURVEYING

BACKGROUND

Borehole seismic surveys are among downhole measurements used in the hydrocarbon industry. Originally, borehole seismic surveys were limited to correlating time-based surface seismic images with depth-based well logs and depth-based reservoir models for the purpose of making drilling decisions. Modern borehole seismic applications, however, extend beyond simple time-depth correlations to generate a variety of useful information about reservoir extent, geometry and heterogeneity, as well as fluid content and pore-pressure, rock mechanical properties, enhanced oil-recovery progress, elastic anisotropy parameters, induced fractures geometry and natural fracture orientation and intensity. Borehole seismic measurements have also extended beyond applications in the hydrocarbon industry to include applications in the hydrology and subterranean carbon sequestration industries.

Regardless of the application, deployment of seismic survey tools in wellbores may be constrained by cost and physical size considerations. For instance, in the hydrocarbon production industry, borehole seismic survey tools may have a diameter of two or more inches and, thus, cannot physically fit in a wellbore if either a drillstring or tubing is in place (unless detectors are placed on the drillstring before drilling is commenced). As a result, the performance of a borehole seismic survey may entail pulling the drillstring or production tubing (if one or the other is in place), running an array of survey tools into the wellbore, conducting the survey, pulling the tool array, and then replacing the drillstring or tubing (if needed). For this reason, a seismic survey may be costly, both in terms of rig time and, in some instances, lost production while the survey is being performed.

Borehole survey tools used as described above can include downhole sensors and electronics. The harsh downhole environment increases the complexity and cost of the sensors and electronics designed to withstand elevated temperatures and pressures for extended periods of time. Consequently, seismic survey tools generally are not treated as disposable, and may not be either abandoned in the wellbore after use or left inactive in a wellbore for extended periods (such as for time-lapse surveys) due to lost revenues that could be obtained by deploying the survey tools in other locations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, an optical seismic tool is disclosed. The optical seismic tool can include a reel of fiber optic cable coupled to an adjustable size ballast and a means to couple to surface equipment including an optical source. The reel of fiber optic cable uncoils via gravity upon deployment of the adjustable size ballast in a wellbore, the uncoiling generating an acoustical coupling force between the fiber optic cable and the wellbore.

In an embodiment, an optical seismic survey system is disclosed. The optical seismic survey system can include a surface acquisition and control unit including a controller and an optical source. The optical seismic survey system can include a seismic source disposed at the surface at or in the wellbore coupled to the surface acquisition and control unit that generates seismic signals when activated by the surface acquisition and control unit. The optical seismic survey system can include an optical seismic tool removably coupled to the surface acquisition and control unit. The optical seismic tool can include a reel of fiber optic cable coupled to an adjustable size ballast and a means to couple to surface equipment including an optical source. The reel of fiber optic cable uncoils via gravity upon deployment of the adjustable size ballast in a wellbore, the uncoiling generating an acoustical coupling force between the fiber optic cable and the wellbore. The surface acquisition and control unit obtains via the fiber optic distributed sensor a plurality of optical measurements relating to a characteristic of one of: 1) the wellbore and 2) a formation through which the wellbore is bored, when the fiber optic distributed sensor is deformed by the seismic signals.

In an embodiment, a method is disclosed for optical seismic tool deployment in a wellbore in borehole seismic surveying. The method can include separably coupling an optical seismic tool at the surface to a surface equipment including an optical source that launches optical pulses into the fiber optic distributed sensor. The method can include deploying the optical seismic tool via one of gravity and a force from pressurised fluid, thereby uncoiling the reel of fiber optic cable. The method can include generating an acoustical coupling force between the fiber optic cable and the wellbore. The optical seismic tool comprises a reel of fiber optic cable coupled to an adjustable size ballast and a means to couple to the surface equipment.

BRIEF DESCRIPTION OF THE DRAWINGS

Embodiments of a system, apparatus, and method for optical fiber well deployment for seismic optical surveying are described with reference to the following figures. Like numbers are used throughout the figures to reference like features and components.

DETAILED DESCRIPTION

Figure 1:
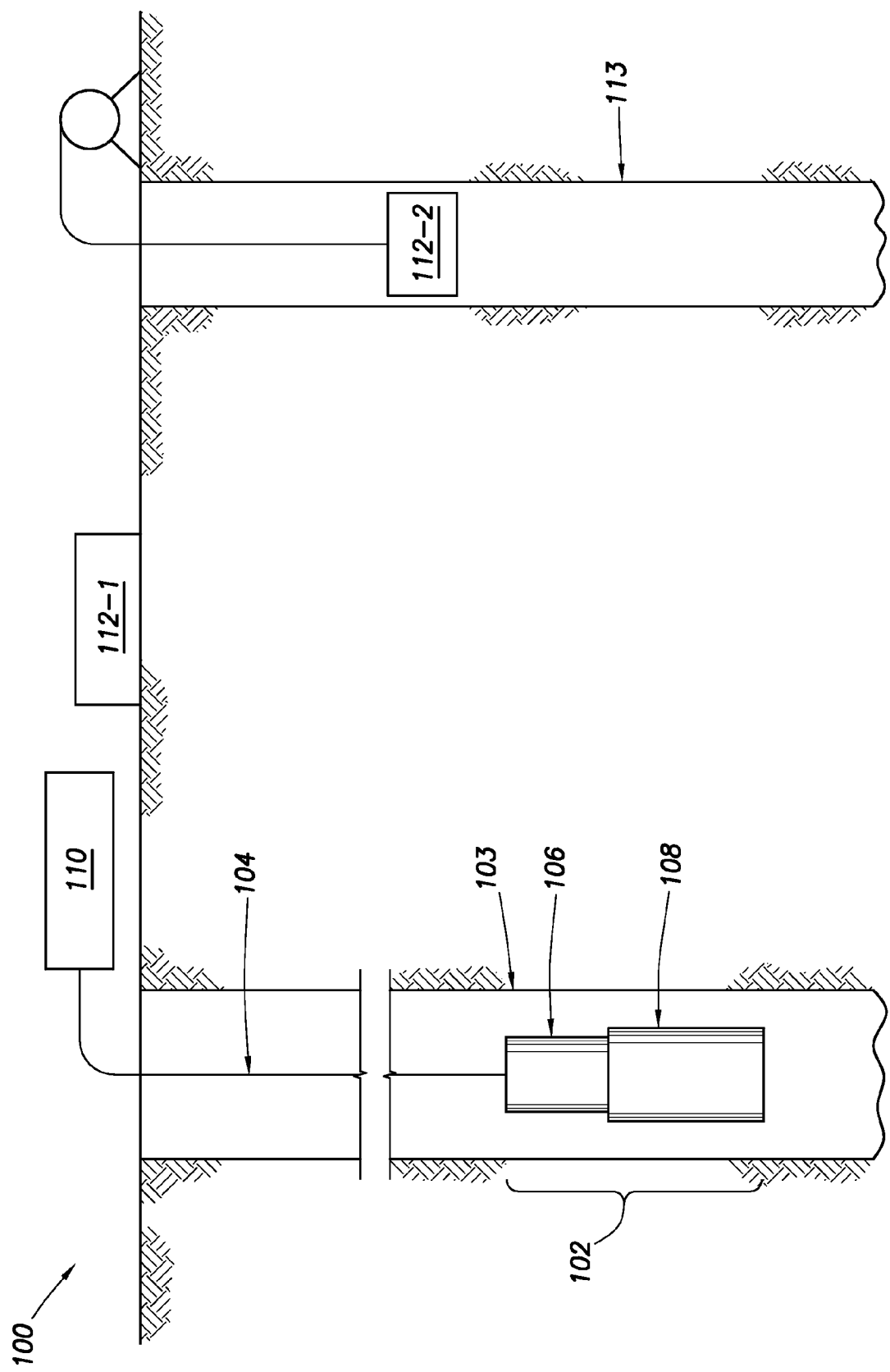
FIG. 1 is a cross-sectional schematic illustration of a cross-well seismic system including an optical seismic tool and a fiber optic distributed sensor deployed therewith in an uncased wellbore, according to an embodiment of the present disclosure.

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to various methods for cost-effective deployment of a disposable fiber optic distributed sensor in a wellbore as part of a borehole seismic survey, the fiber optic sensor operable to obtain measurements of seismic signals using coherent optical time-domain reflectometry (C-OTDR). Embodiments of this disclosure may include methods including deploying a spooled optical fiber distributed sensor into the wellbore integrated in a ballast or weight for a seismic optic tool, to complete deployment via gravity, and/or by a pressurised fluid flow. The method may further include unspooling the spooled optical fiber distributed sensor and using the optical fiber as a distributed seismic receiver. In addition, the method may include triggering a seismic signal with a seismic source and recording the seismic signal in the wellbore using a coherent optical time-domain reflectometry (C-OTDR). In some embodiments, the recording may be done with the C-OTDR, including phase-measurement. Once the fiber optic distributed sensor is deployed according to methods of the present disclosure, surveys may be obtained and processed by various methods, for example, such as disclosed in U.S. Patent Publication 2011/10292763 to Coates et al., commonly assigned with the present disclosure.

In various survey geometries, borehole seismic surveys have been performed by recording seismic signals using a single sensor or an array of sensors located in a wellbore that extends from the earth surface into a sub-surface formation. Depending on the particular application, seismic signals may be generated by one or more seismic sources located on the earth surface, in the wellbore in which the seismic signals are detected, in an adjacent wellbore, and/or in the formation surrounding the wellbore. A wide variety of seismic sources may be used to generate the seismic signals. For instance, surface seismic sources may include air-guns, accelerated weight drops, vibrator trucks, and explosives. Common downhole seismic sources may include piezoelectric pulsers, orbital-, vertical- and radial-vibrators, hammers, air-guns, sparkers, implosive canisters, and explosives. In some cases, such as in microseismic or hydrofracturing monitoring applications, the seismic signals are emitted either when fractures are generated in the surrounding formation or when the rock on either side of existing fractures slip relative to one another. Depending on the particular application in which the monitoring is being performed, the seismic source may be located at a single location, a limited number of locations (e.g., arranged in a single line along the wellbore or over the ground surface), or in multiple locations so as to substantially cover the entire surface of the earth in the vicinity of the wellbore in which the sensors are detecting the seismic signals (e.g., arranged in multiple parallel lines, in multiple lines radiating outward from a single location, in a spiral, or in a random or pseudo-random manner).

As an alternative to a variety of types of known seismic sensors described above, such as hydrophones, geophones, accelerometers, or a combination thereof, coupled to electrical components downhole which amplify, condition (e.g., band pass filter) and digitize the electrical signals generated by the sensors in response to detection of a seismic event, in accordance with embodiments of the present disclosure, seismic signals (including microseismic signals) propagating through an earth formation outside a wellbore can be detected using one or more fiber optic distributed vibration (i.e., fiber optic cable) sensors deployed in the wellbore in lieu of a plurality of distinct sensors deployed at various locations in the wellbore. The small diameter of the optical cable fiber (e.g., an outer diameter of 125 microns or 250 microns with the buffer surrounding the fiber, or in another example, ranging between 80 and 200 microns fibers, and optionally not to exceed 500 microns ($\frac{1}{50}$"$\frac{1}{4}$ inch or less) allows for deployment of the fiber optic distributed sensor inside the drillstring or in an open, uncased well. Further, an optical fiber seismic signal detection system reduces costly downhole electronics. Instead, the electronics for acquiring seismic data from the fiber optic sensor may be located on the surface. The relatively inexpensive fiber optic sensor itself is deployed downhole and, due to its non-toxic nature, may be abandoned or left inactive in the wellbore after use. In other words, the fiber optic sensor may be treated as a disposable item.

In order to measure seismic signals using a fiber optic distributed vibration sensor, optical pulses can be launched into the fiber optic distributed sensor, and reflected or scattered light generated in response to the pulses can be detected over an extended period of time. The scattered light that is generated while seismic waves originating outside the wellbore are incident along the length of the fiber optic distributed sensor may provide information about characteristics of the formation surrounding the wellbore, including changes in these characteristics over a period of time. Such characteristics may include reservoir extent, geometry and heterogeneity, as well as fluid content and pore pressure, rock mechanical properties, enhanced oil-recovery progress, $CO_2$ sequestration progress, elastic anisotropy parameters, induced fractures geometry and natural fracture orientation and intensity. In some embodiments, the fiber optic distributed sensor may be removably coupled to surface electronics for interrogating and acquiring seismic or microseismic event data detected by the fiber optic distributed sensor.

In some embodiments, the optical fiber cable is wound on a storage device such as a reel, producing a spooled optical fiber distributed sensor. Although a reel is described in this simplified embodiment, other embodiments may not be limited to this example. The optical fiber distributed sensor may be contained within a outer circumferential compartment in which the center axis of the compartment is parallel to the axis of the tool or wellbore. Additionally, the optical fiber distributed sensor may be wound around a free-wheeling pulley, a shaft of a motor, or any of a number of mechanisms used to allow for the storage and deployment of cable and/or line.

In any of the embodiments described herein, the optical fiber distributed sensor may be either a single-mode fiber or a multi-mode fiber, depending on the particular application as well as on the particular surface equipment having an interrogation and data acquisition unit (SIDAU) 110 equipment used to collect data from the fiber optic sensor.

Regardless of the deployment location and technique used, seismic signals (generated during a seismic survey, for instance) may be detected by any one or more of the fiber optic distributed sensors as shown in FIG. 1. As an example, any of the following types of seismic surveys may be performed with one or more fiber optic distributed vibration sensors being used in place of traditional receiver arrays: Checkshot, Salt-Proximity Surveys, Zero-Offset Vertical Seismic Profile (VSP), Walkabove VSP, Offset VSP, Multi-Offset VSP, Walkaway VSP, Walk-Around VSP, MultiAzimuth Walkaway VSP, 3D VSP, Crosswell Seismic, Hydrofacture Monitoring (HFM), Microseismic Monitoring, and Time-Lapse Borehole Seismic. The foregoing surveys are provided as examples only and that the techniques and seismic monitoring systems described herein may be used to monitor seismic signals generated in other scenarios, both stimulated and naturally occurring.

FIG. 1 is a cross-sectional schematic illustration of a cross-well seismic system 100 including an optical seismic deployment tool 102 including a fiber optic distributed sensor deployed therewith in an uncased wellbore 103, according to an embodiment of the present disclosure. An optical fiber cable 104 is wound (i.e., in a storage device such as a reel 106), producing a spooled optical fiber reel. Although a reel 106 is described in this simplified embodiment, other embodiments may not be limited to this example.

As shown in FIG. 1, in this embodiment an optical fiber cable 104 is wound on a reel 106 and coupled to a ballast 108 in order to deploy to a given depth via gravity. The weight of the ballast 108 may be adjusted and the shape configured to facilitate gravity deployment. The use of gravity conveyance may be appropriate for low deviation wells in which the angle of the wellbore 103 allows gravity to overcome frictional forces, thereby bringing the optical seismic tool 102 to total depth (TD).

In other embodiments involving a deviated well (that is, that at least partially deviates from the vertical), a traction engine or the surrounding pressurized fluid in the wellbore 103 may be used to deploy the optical seismic tool 102. In an embodiment, it is also possible to replace the ballast used to deploy the fiber by gravity, with an active carrier including a tractor, a propeller or any similar system, to displace the carrier in a deviated (i.e., horizontal) well when gravity is inactive to deploy the fiber. Such devices act on the carrier, the ballast or any other mechanical assembly enclosing the fiber reel, but not on the fiber itself, such that the fiber cable is deployed passively by the displacement of the carrier. The fiber length extracted from the reel is thus related directly to the displacement of the carrier, even if the fiber cable is twisted to result in a helical shape when deployed in the well.

In some cases, embodiments of the optical fiber cable 104 are wound in advance on a reel that is generally free-standing. In other words, after the coil has been wound and cured, no former is required to keep the optical fiber cable 104 in the reel. An example of a cured and wound coil is described in U.S. Pat. No. 6,561,488. In such an embodiment, once an optical fiber cable 104 has been deployed from such a coil, rewinding back into reel form may be difficult. Thus, for embodiments of the present disclosure it is possible that the optical fiber cable 104 and ballast 108 portions of the tool may be relatively low value components intended for a single use, while the more expensive, long-term use electronics remain in surface equipment. A weak joint, severable connection, or remotely actuated cutting device or solenoid (among other examples) may be incorporated.

Spooled optical fiber deployed in the manner described here may lie against the wall of the well once the depth of the optical seismic tool exceeds a few hundred meters. However, the optical fiber may optionally include a coating to make an acoustic coupling more likely, i.e., that the optical fiber will lie against the wall of the wellbore, based for example on surface tension or magnetism. In an embodiment, the deployment of optical fiber may comprise winding a twisted optical fiber around the reel in order to cause the optical fiber to lay flat against the wall of the well. Upon deployment in the well, the fiber optic may take the helical shape of a spring that, upon deployment in the well, relaxes to contact the wellbore wall. Causing the optical fiber to lay against the wellbore wall may be desirable in some circumstances or applications. The relatively small mass of the optical fiber and the small forces required to extend the optical fiber in response to a seismic wave mean that a low-force contact between the optical fiber and the wellbore wall is sufficient to provide adequate acoustical coupling to seismic waves in the formation.

The cross-well seismic system 100 shown in FIG. 1 also includes the surface equipment having an interrogation and data acquisition unit (SIDAU) 110. The surface equipment may additionally include at least a surface seismic source 112-1 (or an array of sources). The cross-well seismic system 100 also includes a seismic source 112-2 in an adjacent wellbore 113. Though FIG. 1 shows sources at the surface and in one adjacent wellbore, seismic signals may be generated by one or more seismic sources located on the earth surface, in the wellbore in which the seismic signals are detected, in an adjacent wellbore, and/or in the formation surrounding the wellbore.

Figure 2:
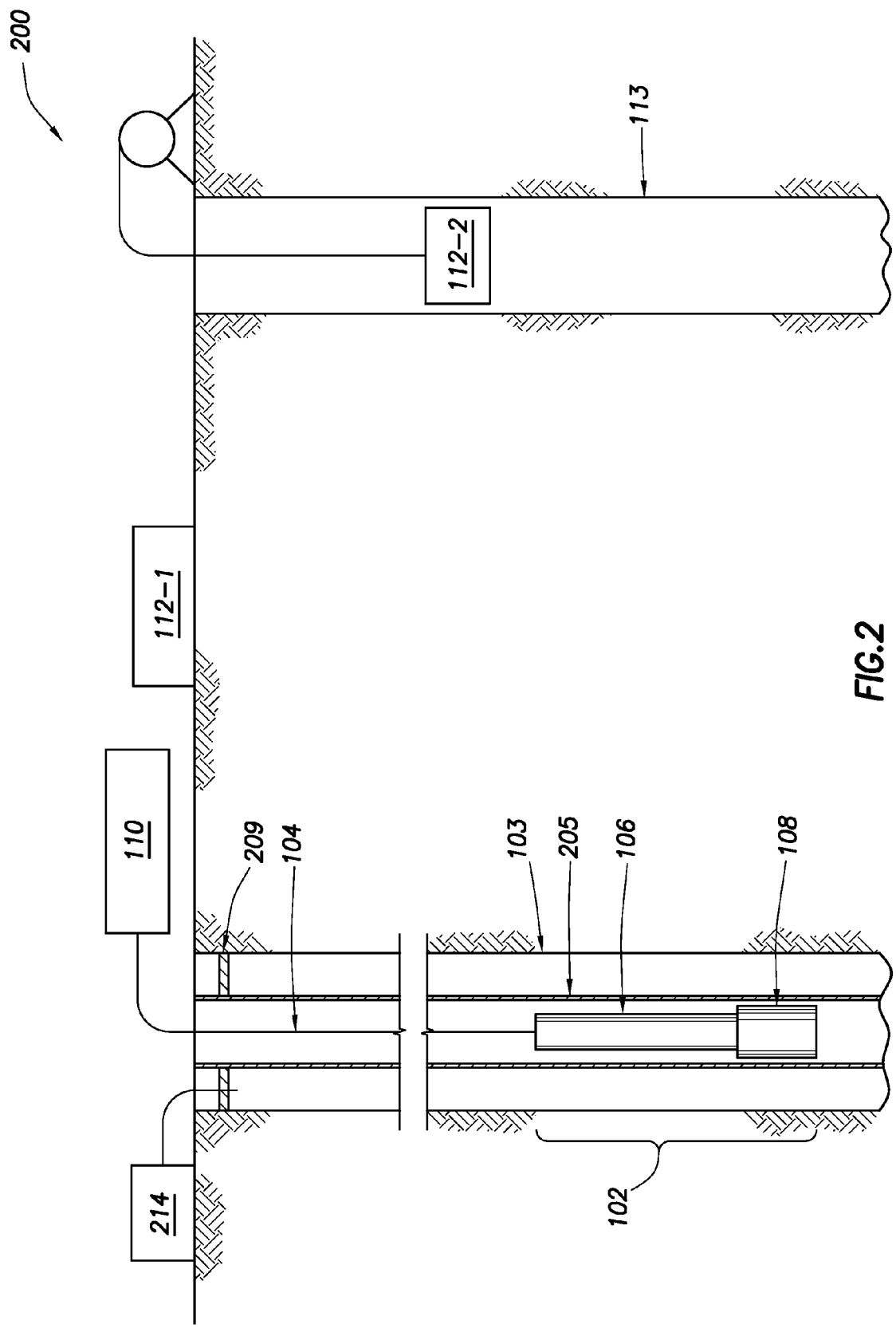
FIG. 2 is a cross-sectional schematic illustration of a cross-well seismic system including an optical seismic tool and a fiber optic distributed sensor deployed therewith in a drillpipe in pressurised fluid, according to an embodiment of the present disclosure.

Embodiments of the optical seismic tool 102 may also be used in pressurized wells. FIG. 2 is a cross-sectional schematic illustration of a cross-well seismic system 200 including an optical seismic tool 102 and a fiber optic distributed sensor deployed therewith in a drillpipe 205 in pressurised fluid, according to an embodiment of the present disclosure. In such embodiments, the optical seismic tool 102 may be inserted into the wellbore 103 via a pressure barrier 209 (such as a wellhead outlet, pressure isolation valve, or temporary seal) and allowed to free-fall to a given depth in the wellbore 103 (such as, in some cases the bottom, or a particular depth under investigation). The spooled optical fiber 104 may be attached at the surface to the SIDAU 110 and configured to uncoil from the optical seismic tool 102 as the optical seismic tool 102 travels downward in the fluid through the wellbore 103. The travel speed may be controlled by a combination of the weight of the ballast 108, flow rate of fluid in the well (if any), fluid drag based on the shape and area of the optical seismic tool 102, as well as the viscosity of the fluid in the wellbore 103 (also referred to as borehole). Depending upon the application, the optical seismic tool 102 may include a device, such as a protruding fin, to increase the drag and thereby slow the rate of descent of the optical seismic tool 102.

To acquire seismic data, the SIDAU 110 converts minute dynamical strains of the optical fiber cable 104 into an optical signal and thence an electrical signal that can be digitized and stored or further processed to provide a signal in one of the formats accepted by the seismic industry, such as LDF file format or SEG-Y file format. One example approach to processing in the SIDAU 110 is based on the principle of coherent Rayleigh backscatter (sometimes also referred to as coherent Rayleigh noise). In this case, one or more short probe pulses of coherent light is(are) launched into the optical fiber cable 104 and the resulting backscatter at roughly the same optical frequency as the probe pulses is analysed. Techniques for interrogating the sensing fibre are described for example in the following patents or patent applications: US2012/0067118A1, GB2 222 247A, WO2010/136810A2, GB2 401 738A, WO2006/048647A2, U.S. Pat. No. 5,194,847). In some embodiments, the SIDAU 110 might be configured, in an embodiment, to measure other parameters such as temperature or strain profiles.

In yet another embodiment, the optical fiber cable 104 can include weak reflectors such as Fibre Bragg gratings (FBG), which can be interrogated using various techniques not the primary subject of the present disclosure. Such an FBG can be used with the twisted fiber technique to determine the optical fiber's helix pitch and theoretically, to correlate true depth and fiber length, given that tension exerted on the fiber may tend to elongate the fiber. The FBGs may be inscribed during the fiber drawing process and form a sensor array, rather than a continuous, fully distributed sensor. Means of interrogating reflective arrays such as this have been previously described, for example in GB2 126 820 or in WO2010/045286.

As shown in FIG. 2, a longer, smaller diameter optical seismic tool 102 may be connected to a ballast 108 having a torpedo or dart shape. Rig pump 214 may be activated to pump-in the optical seismic tool 102 inside of the drill pipe 205. In this case, the optical seismic tool 102 is deployed by fluid pressure rather than gravity (as was the case in FIG. 1). An approach using pressurised fluid to pump in the optical seismic tool 102 may be used, for example but not limited to, for deviated wells, up to and beyond horizontal. Other aspects of the deployment of the optical fiber cable 104 via the optical seismic tool 102 moving down the drill pipe may be similar to those already described in the context of FIG. 1.

Figure 3:
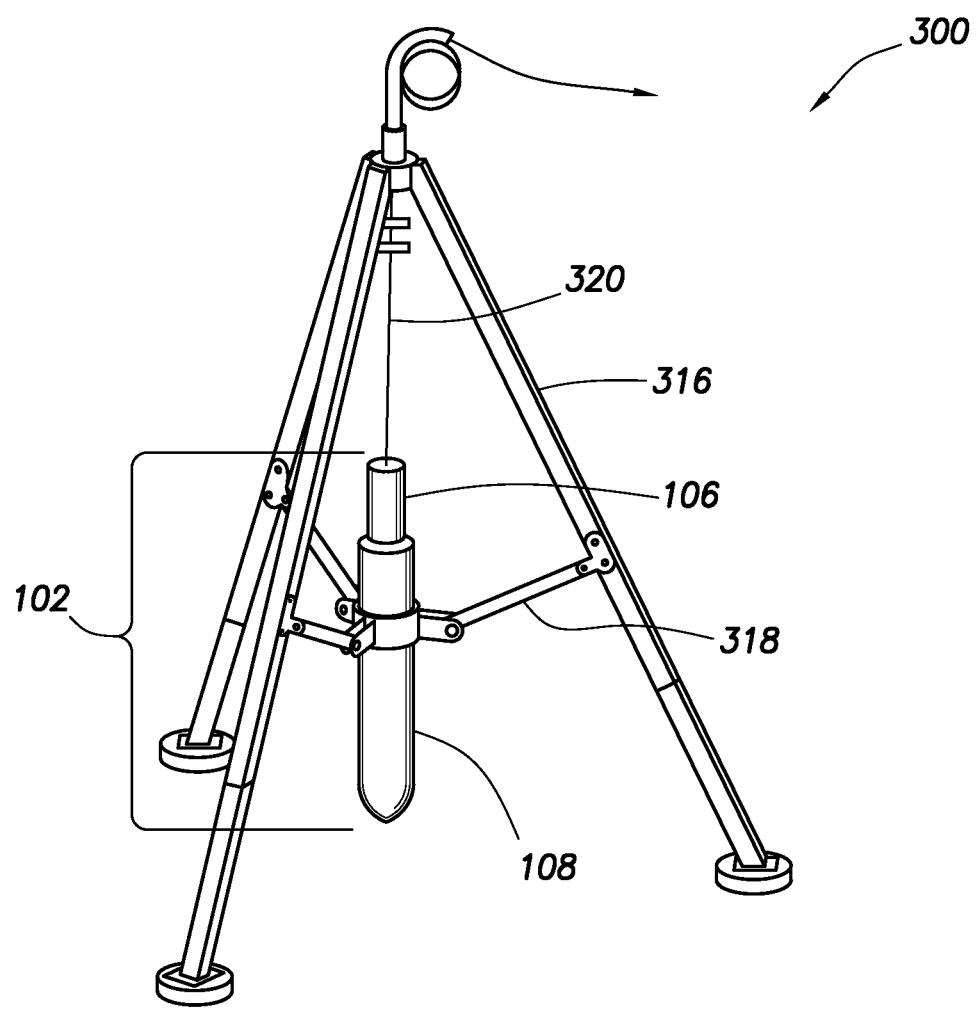
FIG. 3 shows an illustration of a launching apparatus having an optical seismic tool in a position for launching (for example, into an unpressurised well), according to an embodiment of the present disclosure.

FIG. 3 shows an illustration of a launching apparatus 300 having an optical seismic tool 102 in a position for launching (for example, into an unpressurised well), according to an embodiment of the present disclosure. In some applications or environments, where it is unacceptable to leave items such as the ballast 108 in the well, the optical seismic tool 102 can be lowered for example, from a tripod 316 as shown, on a suitable conveyance 320, such as a slickline, wireline or coil tubing, for example. Centralizing arms 318 may be used to position the optical seismic tool 102 over the wellbore head. The optical seismic tool 102 could optionally be retrieved by rewinding the conveyance 320. The optical fiber cable 104 (not shown in FIG. 3, as the optical fiber cable 104 does not uncoil until deployment in the wellbore) itself may break and remain in the wellbore, but feasibly could be retrieved.

Figure 4:
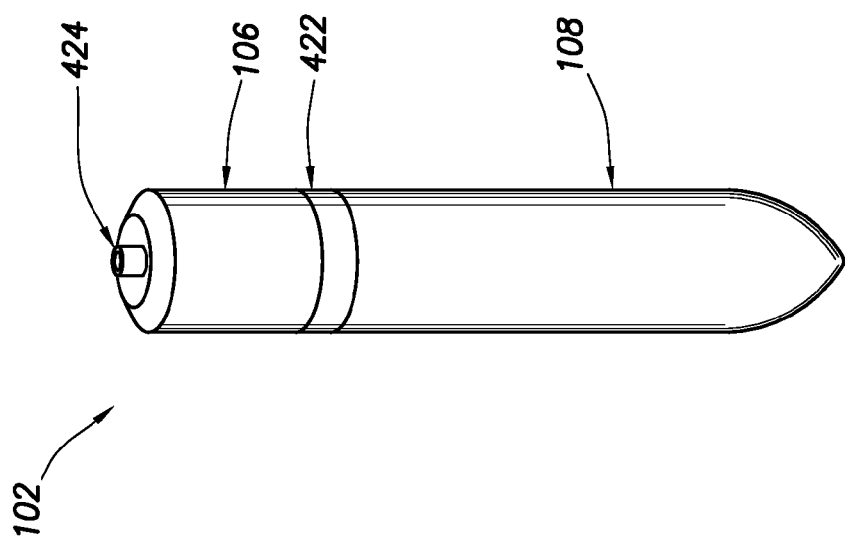
FIG. 4 is an illustration of an optical seismic tool, according to an embodiment of the present disclosure.

FIG. 4 is an illustration of an optical seismic tool 102 in more detail then previous figures, according to an embodiment of the present disclosure, which can be used in any of the embodiments illustrated in FIGS. 1-3. The optical seismic tool 102 can include a ballast 108 at the bottom or downhole end of the tool 102. The ballast 108 may be adjustable in weight, length, or both, in a modular form where weight and length may be added or removed. The ballast 108 weight and length may be selected for the deviation of the wellbore in which it will be used, the density of mud or other fluids in the wellbore, the fluid flow rate planned in the well, and the rate of descent intended for the optical seismic tool 102.

The ballast 108 may be made of a material that is naturally occurring, in an embodiment, allowing abandonment of the ballast 108 in the well upon completion of a survey, such as sand, elemental metals such as aluminum, and the like. In an embodiment, the material for the ballast 108 may be cement. In still another embodiment, the ballast 108 may be made of a material designed to dissolve or be absorbed in the fluid or mud in the wellbore, for example, a rock salt or fine grain lead shot glued together with dissolvable glue, or other material that breaks down or melts under downhole conditions after a given period of time.

The ballast 108 is coupled via a latching mechanism 422, for example a groove, to a fiber reel 106. The fiber reel 106 contains the spooled optical fiber as described above, coiled about a reel or cured into a spooled form in the fiber reel 106. Upon deployment, the optical fiber cable 104 uncoils out of the top of the optical seismic tool 102 through a nozzle 424 (i.e., a fishing head or nozzle). As noted above, the optical fiber cable may have a coating that is protective, adhesive, and/or magnetic.

Figure 5:
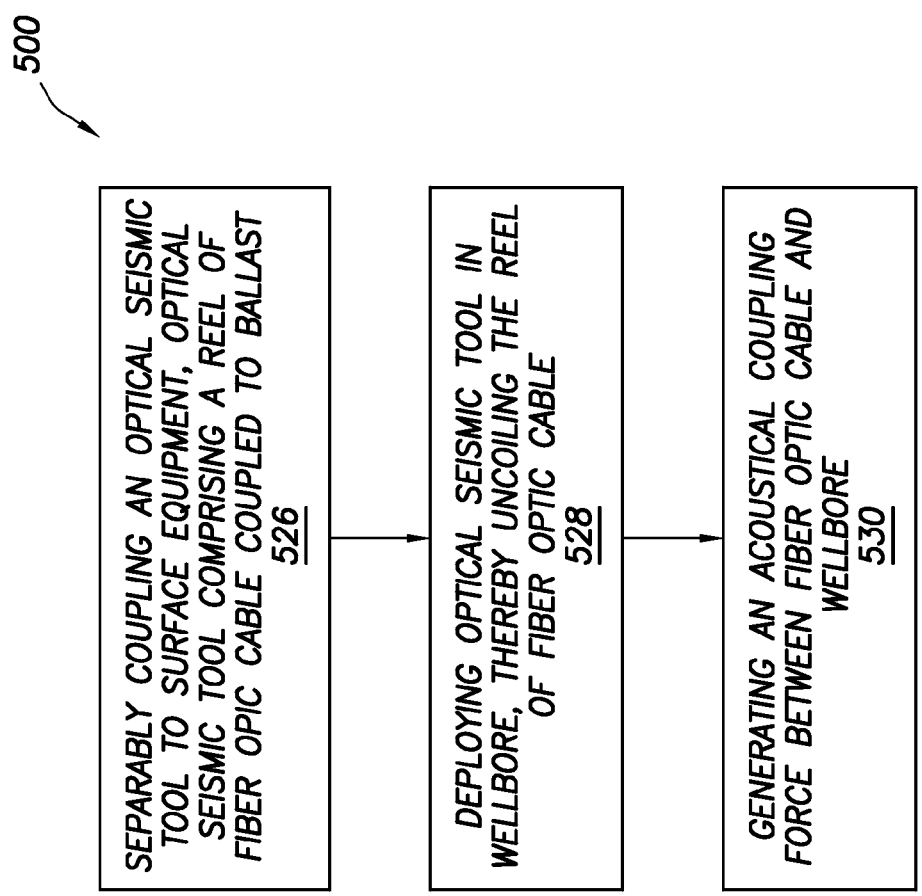
FIG. 5 is a flowchart of a method for optical seismic tool deployment in a wellbore in a borehole seismic surveying, according to an embodiment of the present disclosure.

Referring now to FIG. 5, a flowchart is shown outlining a method 500 for optical seismic tool deployment in a wellbore in a borehole seismic surveying. The method begins with separably coupling 526 an optical seismic tool at the surface to the surface equipment. The surface equipment may include an optical source (not shown separately) that launches optical pulses into the fiber optic distributed sensor, as well as the SIDAU 110. The optical seismic tool comprises a reel of fiber optic cable coupled to an adjustable size ballast and a mechanism that couples to the surface equipment, such as a latch, fishing head, nozzle, and the like.

The method continues with deploying 528 the optical seismic tool via one of gravity and a force from pressurised fluid, thereby uncoiling the reel of fiber optic cable in the wellbore. The method continues with generating 530 an acoustical coupling force between the fiber optic cable and the wellbore such that seismic waves traveling in the formation about the wellbore may be measured by the fiber optic cable. Generating the acoustic coupling contact force between the fiber optic cable and the walls of the wellbore may include coupling the fiber optic to the walls of the wellbore via an adhesive coating, a magnetic coating, and/or outward helical force caused by relaxation of the spooled fiber optic, in a deviated well, generating the acoustic coupling contact force could also include forces caused by gravity as the spooled fiber optic cable relaxes against the walls of the wellbore.

The method can optionally include de-coupling the optical seismic tool from the surface acquisition unit with an integrated decoupler, which may cut, twist, or otherwise separate the optical fiber cable from the SIDAU 110.

The method may optionally further include deploying the optical seismic tool to a first depth at a rate based at least in part on the adjustable size of the ballast coupled to the fiber optic distributed sensor.

The method may optionally further include deploying the optical seismic tool to the first depth via fluid pressure at a rate based on one of flow rate in the wellbore, fluid drag based at least in part on the shape or area of the seismic optic tool, and viscosity of fluid in the wellbore.

The embodiments of the present disclosure may be directed to wells for production of hydrocarbons, injection wells for improving hydrocarbon recovery, geothermal wells for energy extraction or storage, wells of $CO_2$ sequestration and wells drilled for the specific purpose of seismic monitoring. In addition, distributed fiber optic vibration sensors may be deployed in multiple wells in the vicinity of a well containing a seismic source so that multiple simultaneous crosswell seismic surveys may be conducted. Similarly, multiple nearby wells may be instrumented while conducting almost any of the borehole seismic surveys discussed herein. Still further, multiple wells surrounding a well undergoing hydrofracturing stimulation may contain fiber optic vibration sensors for detecting seismic signals generated as a result of the hydrofracturing process.

While the disclosure has been disclosed with respect to a limited number of embodiments, those skilled in the art, having the benefit of this disclosure, will appreciate numerous modifications and variations therefrom. While the disclosure has been described in the context of applications in downhole tools, the apparatus of the disclosure can be used in many applications.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the present disclosure.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The preferred aspects and embodiments were chosen and described in order to best explain the principles of the present disclosure and its practical application. The preceding description is intended to enable others skilled in the art to best utilize the present disclosure in various aspects and embodiments and with various modifications as are suited to the particular use contemplated. In addition, the methods may be programmed and saved as a set of instructions, that, when executed, perform the methods described herein. It is intended that the scope of the present disclosure be defined by the following claims.

What is claimed is:

1. An optical seismic tool, comprising:
   a reel of fiber optic cable coupled to an adjustable size ballast and a means to couple to surface equipment comprising an optical source, wherein the adjustable size ballast comprises one of adjustable weight and adjustable length, wherein the adjustable size ballast is adjustable based on mud density, well deviation and a given rate of descent of the optical seismic tool; and
   wherein the reel of fiber optic cable uncoils via gravity upon deployment of the adjustable size ballast in a wellbore, the uncoiling generating an acoustical coupling force between the fiber optic cable and the wellbore.

2. The optical seismic tool according to claim 1, wherein the reel of fiber optic cable is coupled to the uphole side of the adjustable size ballast.

3. The optical seismic tool according to claim 1, wherein the fiber optic cable further comprises one of a magnetic coating, an adhesive coating, and a protective coating.

4. The optical seismic tool according to claim 1, wherein the acoustical coupling force is generated by one of an adhesive coating, a magnetic coating, an outward helical force caused by relaxation of the spooled fiber optic, and any combination thereof.

5. The optical seismic tool according to claim 1, wherein the reel of fiber optic cable uncoils via gravity as well as a force applied by a pressurised fluid upon deployment of the adjustable size ballast in the wellbore.

6. The optical seismic tool according to claim 1, wherein the adjustable size ballast comprises one of a natural material dissolvable in mud selected from a group consisting of aluminum, cement, salt, and a metal.

7. An optical seismic survey system, comprising:
   a surface acquisition and control unit comprising a controller and an optical source;
   a seismic source disposed at surface or in a wellbore coupled to the surface acquisition and control unit that generates seismic signals when activated by the surface acquisition and control unit; and
   an optical seismic tool removably coupled to the surface acquisition and control unit, comprising:
   a reel of fiber optic cable coupled to an adjustable size ballast and a means to couple to surface equipment comprising an optical source;
   wherein the reel of fiber optic cable uncoils via gravity upon deployment of the adjustable size ballast in the wellbore, the uncoiling generating an acoustical coupling force between the fiber optic cable and the wellbore,
   wherein the surface acquisition and control unit, upon deployment of the optical seismic tool in the wellbore, obtains, via a fiber optic distributed sensor, a plurality of optical measurements relating to a characteristic of one of: 1) the wellbore and 2) a formation through which the wellbore is bored, when the fiber optic distributed sensor is deformed by the seismic signals.

8. The optical seismic survey system according to claim 7, wherein the adjustable size ballast comprises one of adjustable weight and adjustable length.

9. The optical seismic survey system according to claim 8, wherein the adjustable size ballast is adjustable based on mud density and a given rate of descent of the optical seismic tool.

10. The optical seismic survey system according to claim 7, wherein the reel of fiber optic cable is coupled to the uphole side of the adjustable size ballast.

11. The optical seismic survey system according to claim 7, wherein the fiber optic cable further comprises one of a magnetic coating, an adhesive coating, and a protective coating.

12. The optical seismic survey system according to claim 7, wherein the acoustical coupling force is generated by one of an adhesive coating, a magnetic coating, an outward helical force caused by relaxation of the spooled fiber optic, and any combination thereof.

13. The optical seismic survey system according to claim 7, wherein the reel of fiber optic cable uncoils via gravity as well as a force applied by a pressurised fluid upon deployment of the adjustable size ballast in the wellbore.

14. A method for optical seismic tool deployment in a wellbore in a borehole seismic surveying, comprising:
   separably coupling an optical seismic tool at surface to surface equipment comprising an optical source that launches optical pulses into the optical seismic tool;
   wherein the optical seismic tool comprises a reel of fiber optic cable coupled to an adjustable size ballast and a means to couple to the surface equipment;
   deploying the optical seismic tool via one of gravity and a force from pressurised fluid, thereby uncoiling the reel of fiber optic cable, wherein the optical seismic tool is deployed to a first depth via fluid pressure at a rate based on one of flow rate in the wellbore, fluid drag based at least in part on the shape or area of the seismic optic tool, and viscosity of fluid in the wellbore; and
generating an acoustical coupling force between the fiber optic cable and the wellbore.

15. The method according to claim 14, further comprising de-coupling the optical seismic tool from the surface acquisition unit.

16. The method according to claim 14, further comprising deploying the optical seismic tool to a first depth at a rate based at least in part on the adjustable size of the ballast coupled to a fiber optic distributed sensor.

17. The method according to claim 14, wherein generating the acoustic coupling force between the fiber optic cable and the walls of the wellbore further comprises coupling the fiber optic to the walls of the wellbore via one or more of an adhesive coating, a magnetic coating, and outward helical force caused by relaxation of the spooled fiber optic.

* * * * *